Jan. 31, 1939.  J. BIERMANNS  2,145,707
SYSTEM FOR TESTING ELECTRICAL APPARATUS
Filed Jan. 27, 1938
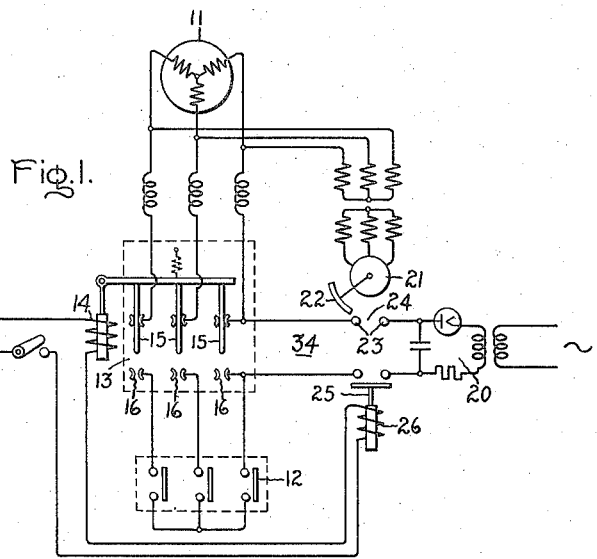
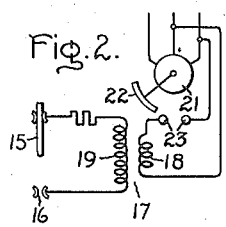
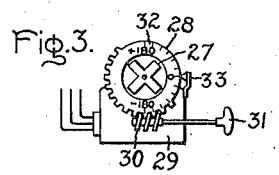
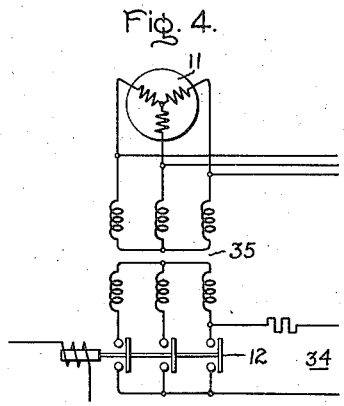
Inventor:
Josef Biermanns,
by Harry E. Dunham
His Attorney.

Patented Jan. 31, 1939

2,145,707

UNITED STATES PATENT OFFICE 2,145,707

SYSTEM FOR TESTING ELECTRICAL APPARATUS

Josef Biermanns, Berlin-Johannisthal, Germany, assignor to General Electric Company, a corporation of New York Application January 27, 1938, Serial No. 187,323
In Germany January 13, 1937

10 Claims. (Cl. 175—183)

My invention relates to systems for testing electrical apparatus and concerns particularly such systems for testing apparatus under suddenly applied short circuits.

It is an object of my invention to provide an improved system for testing current interrupting devices such as circuit breakers and to control definitely the instant of application of the testing current in relation to the electromotive force wave of the current source.

It is a further object of my invention to provide a testing system with means for controlling the magnitude of the direct current component of the testing current.

Other and further objects and advantages will become apparent as the description proceeds.

In short circuit testing systems the problem arises that the instant of initiation of the short circuit cannot be determined beforehand with sufficient accuracy. Consequently, there is produced a discrepancy in the process which is more or less left to chance and which involves the dependency of the so-called direct current component upon the time when the current is initiated. The presence of the direct current component, at least of one of unforeseen magnitude is disturbing in short-circuit tests for the reason that the machines of the short circuit testing system cannot be fully utilized. Owing to the appearance of the direct current component, the current amplitude is practically doubled and the dynamic stress is approximately quadrupled. Additional alternating current stresses occur on the rotors of the short circuit testing machines on account of the direct current components. In order to attain a clear insight into the capacity of the switches or other apparatus to be tested it therefore, becomes necessary to await the damping-out of the direct current component. If the direct current component can be initially suppressed, then the subsequent opening operation in the case of a circuit breaker being tested can take place much sooner after the short circuit has been produced, the alternating current component is damped to a less extent and the testing machine is, therefore, better utilized in this respect for the purpose of testing.

On the other hand, it is important for some switch constructions, to know as much as possible about their behavior also in the presence of a direct current component. Furthermore, in such cases an arrangement is desirable for producing the direct current component with safety at a height exactly determined beforehand, in order to avoid being obliged to make intermediate tests unnecessarily in which the instant of initiation of current occurs by chance.

In accordance with my invention in its preferred form, the instant of initiation of current through a circuit breaker having metallic or solid contacts is fixed by initiating a current at a given instant even though the contacts cannot yet be closed. Control of the magnitude of the direct current component is accomplished not by leaving the instant of origination of the short circuit to chance movement of the switching device provided for the introduction of the short circuit. Instead an additional or auxiliary voltage is injected or superimposed at an instant dependent upon the voltage wave of the short-circuit-current generator. The conditions are usually such that the short circuit is induced by means of a special switch and is interrupted by means of a circuit breaker to be tested. The following explanations refer primarily to such an arrangement, although they are equally well applicable to cases in which the appliance to be tested both introduces and interrupts the short circuit.

The invention may be understood more readily from the following detailed description when considered in connection with the accompanying drawing and those features of the invention which are believed to be novel and patentable will be pointed out in the claims appended hereto. In the drawing Figure 1 is a diagram showing the electrical circuits of one embodiment of my invention. Figure 2 is a fragmentary circuit diagram of a modification in the embodiment of Figure 1. Figure 3 is a schematic diagram representing more in detail a form of synchronous generator which may be used in connection with the apparatus of Figures 1 and 2. Figure 4 is a fragmentary circuit diagram representing a testing arrangement for circuit interrupting apparatus in which the apparatus to be tested serves both for applying and interrupting the short circuit. Like reference characters are utilized throughout the drawing to designate like parts.

In the embodiment of Figure 1 of the drawing there is a generator 11 for supplying short circuit testing current to an object to be tested such as a circuit breaker 12, which may, for example, be a high voltage oil-filled switch. An auxiliary circuit breaker 13 is provided for introducing the short circuit and the circuit breaker 13 includes an operating mechanism of any desired, well-known type for opening and closing the contacts. Such a mechanism is represented schematically by a switch operating coil 14 cooperating with an armature attached to movable contacts 15 of the circuit breaker. The circuit breaker 13 also contains stationary contacts 16 cooperating with the movable contacts 15. Thus the voltage of the current source 11 appears between the relatively movable contacts 15 and 16. In the case of relatively high voltage apparatus in which sparking or arcing may take place, this phenomenon depends not merely upon the amplitude of the applied voltage but also upon the speed of the movable contacts 15. Particularly in oil-filled switches it may happen that when the voltage is a maximum the switch contacts are still so far apart that the resistance of the oil cannot be overcome, but shortly afterwards, although the voltage is nearly zero the distance between the contacts has been reduced so much that a current arc may be started. Consequently, rapidity of the closing of the contacts cannot be disregarded in connection with obtaining definite control of the electrical phenomena dependent upon the operation of closing the switch.

In my apparatus an auxiliary or additional voltage is added to the voltage of the current source existing between the contacts in order to fix appropriately the instant at which current begins to flow. For the purpose of providing such an auxiliary voltage I may provide a voltage transformer 17 (Fig. 2) having a primary winding 18 energized directly or indirectly by the current source 11 and a secondary winding 19 connected to the switch contacts 15 and 16 as shown in Figure 2. Although I have represented connection of auxiliary voltage to only one phase it will be understood that in the case of polyphase apparatus such as that illustrated in Figure 1, additional transformers or other means for supplying auxiliary voltage may be provided if desired for injecting the auxiliary voltages across the contacts in each of the phases of the circuit breaker 13.

My invention is not limited to any particular form of arrangement for generating the injected voltage and includes not only the use of a transformer such as shown in Figure 2, but also such apparatus as impulse or surge generators or even Tesla-transformers. In Figure 1 a surge generator 20 is represented for injecting an auxiliary voltage in one of the phases of the circuit breaker 13. It will be understood that in this case also additional surge generators will be provided for the remaining phases in the case of polyphase apparatus. The release of the voltage from the surge generator may be accomplished in any desired manner.

Regardless of the type of generating means employed for producing the injected voltage the arrangement is such that the application of the auxiliary voltage and the initiation of current in the switch 13 is synchronized with the voltage wave of the source of testing current 11 which is shown as a synchronous generator. For example, a synchronous motor 21 connected to the output terminals of the generator 11 so as to run synchronously therewith may carry a rotating contact 22 designed to close fixed contacts 23 for releasing the auxiliary voltage at the desired instant in the voltage cycle of the generator 11. In the arrangement of Figure 2 the contacts 23 are in the primary circuit of the transformer 17. When the impulse generator 20 is utilized there may be a spark gap 24 over which the voltage surge of the surge generator 20 is caused to discharge at the desired instant by proximity of the rotating contact 22. In the arrangement of Figure 1 a switch 25 having an operating winding 26 energized at the same time as the operating winding 14 of the circuit breaker 13 may also be provided for connecting the surge generator 20 to the circuit breaker 13 at the stationary contact 16 when the breaker 13 is operated.

It is evident from the foregoing description that the arrangements of Figures 1 and 2 permit initiation of the current flow with equal surety and definiteness in each of the phases of apparatus to be tested and that the current may be initiated either during maximum voltage of the testing current supply source or at an instant of zero voltage or at some intermediate point of the voltage wave of the testing current supply source in order to obtain any desired value of direct current component or in order to eliminate the direct current component entirely. It will be understood that the direct current component of the current rush taking place when the contacts are closed may be kept at zero by causing the current to be initiated at the point in the voltage wave corresponding to zero flux under steady conditions in those portions of the apparatus which contain iron in a magnetic circuit and are unexcited before the connections are closed. Such current rushes are liable to be very great in the case of transformers being switched on to a line, but exist to some extent in any electrical apparatus having portions of magnetic material subjected to alternations of polarity of the magnetic flux.

In order to obtain adjustment of the point in the voltage wave at which the testing current is initiated, suitable means may be provided for varying the phase relationship between the instant of release of the auxiliary voltage in any phase and the instant of maximum voltage of that phase of the generator 11. For example, the synchronous motor 21 may be so constructed as to have not only a rotor 27 rotating relatively to a stator 28, but to have the stator 28 also rotatable with respect to the base 29 of the machine. A portion of the periphery of the stator 28 may be toothed for cooperation with a worm 30. A rotatable hand wheel 31 connected to the worm 30 may be provided for varying the angular position of the stator 28. In the case of a four-pole machine, for example, rotation of the stator through 180 mechanical degrees will correspond to 360 electrical degrees so that a scale 32 covering 180 mechanical degrees and cooperating with an index 33 may be provided for indicating the phase relationship between the instant at which current is released in any phase and the instant at which the voltage of the same phase of the machine 11 is a maximum.

Figure 4 represents the manner of arranging the apparatus when an electrical interrupting device 12, which is to be tested, serves also for closing the electrical circuit. In this case, the arrangement 34 for injecting the auxiliary voltage is connected across the contacts of the tested device 12. Figure 4 illustrates also an arrangement in which a step-down transformer 35 is employed to obtain current of greater magnitude for testing the device 12 and the elimination of direct-current components of current becomes particularly important.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:—

1. A system for testing circuit interrupting devices comprising a synchronous generator for supplying short circuit current, an auxiliary circuit interrupting device for connecting said generator to a circuit interrupting device to be tested, means for injecting an auxiliary voltage across the auxiliary circuit interrupting device to fix the instant of commencement of current flow, and means for synchronizing said injected voltage with the synchronous generator.

2. A testing system for electrical apparatus comprising a synchronous generator for supplying testing current, a circuit interrupting device for connecting said generator to apparatus to be tested, a transformer with a secondary winding connected across the circuit interrupting device and with a primary winding energized from a current source in synchronism with the synchronous generator output, a switch for connecting said primary winding to its energizing source, and means for operating said switch in synchronism with the synchronous generator.

3. An electrical testing device comprising a synchronous generator for supplying testing current, a circuit interrupting device having relatively movable contacts for connecting said synchronous generator to apparatus to be tested, a surge generator having output terminals, means for connecting said terminals to the contacts of said circuit interrupting device, and means for synchronizing the operation of said connecting means with the synchronous generator.

4. In combination an electrical apparatus to be tested, a synchronous generator for supplying testing current, an auxiliary circuit interrupting device with relatively movable contacts for connecting said apparatus to said generator with means for closing said contacts, means for applying an auxiliary voltage between the said contacts to fix the instant of commencement of current flow and means for synchronizing the application of said auxiliary voltage with the synchronous generator.

5. An electrical testing system comprising a synchronous generator for supplying testing current, a circuit interrupting device for connecting said generator to apparatus to be tested, means for injecting an auxiliary voltage across the circuit interrupting device to fix the instant of commencement of current flow and means for adjusting the time relationship between the electromotive force wave of the generator and the instant of application of said injected voltage.

6. A system for testing electrical apparatus comprising a synchronous generator for supplying testing current, a circuit interrupting device having relatively movable contacts for connecting said generator to apparatus to be tested, means for injecting an auxiliary voltage between said contacts to fix the instant of commencement of current flow and means for synchronizing said voltage injecting means with the synchronous generator.

7. A method of testing electrical apparatus in alternating-current circuits which comprises applying testing current to the apparatus through a circuit interrupting device having contacts by causing said contacts to start closing, applying an auxiliary voltage to produce an arc between the contacts in order to fix definitely the instant of initiation of current, and controlling the time relationship between the electromotive force wave of the testing current source and the instant of initiation of current to regulate the direct-current component value of the testing current.

8. A method of testing electrical apparatus in alternating current circuits which comprises connecting a source of alternating current to the apparatus through a circuit interrupting device having solid contacts by causing said contacts to start closing, applying an auxiliary voltage to produce an arc between the contacts in order to fix definitely the instant of initiation of current, and controlling the time of application of the auxiliary voltage and initiating the current at the point in the electromotive force wave of the current source corresponding to zero magnetic flux in the initially unexcited portion of the electrical apparatus.

9. In combination a circuit interrupting device to be tested, a synchronous generator for supplying testing current, said interrupting device having relatively movable contacts to connect it across said generator and having means for closing said contacts, means for applying an auxiliary voltage between the said contacts to fix the instant of commencement of current flow and means for synchronizing the application of said auxiliary voltage with the synchronous generator.

10. A system for testing circuit interrupting devices comprising a synchronous generator for supplying short circuit current having terminals for connection to the contacts of a circuit interrupting device, means for superimposing an auxiliary voltage upon the generator voltage to fix the instant of commencement of current flow and means for synchronizing said injected voltage with the synchronous generator.

JOSEF BIERMANNS.